United States Patent
He et al.

(10) Patent No.: US 12,118,698 B1
(45) Date of Patent: Oct. 15, 2024

(54) METHOD FOR INPAINTING HIGHLIGHT REGION OF VEGETATION IMAGE CAPTURED BY UNMANNED AERIAL VEHICLE, DEVICE, MEDIUM, AND PRODUCT

(71) Applicant: Chengdu University of Technology, Chengdu (CN)

(72) Inventors: Jing He, Chengdu (CN); Yifu Chen, Chengdu (CN); Gang Liu, Chengdu (CN); Weile Li, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 18/631,002

(22) Filed: Apr. 9, 2024

(30) Foreign Application Priority Data

Mar. 5, 2024 (CN) .......................... 202410247135.1

(51) Int. Cl.
| | |
|---|---|
| *G06T 5/77* | (2024.01) |
| *G06V 10/25* | (2022.01) |
| *G06V 10/44* | (2022.01) |
| *G06V 10/60* | (2022.01) |
| *G06V 10/75* | (2022.01) |
| *G06V 20/10* | (2022.01) |
| *G06V 20/17* | (2022.01) |

(52) U.S. Cl.
CPC .............. *G06T 5/77* (2024.01); *G06V 10/25* (2022.01); *G06V 10/44* (2022.01); *G06V 10/60* (2022.01); *G06V 10/751* (2022.01); *G06V 20/17* (2022.01); *G06V 20/188* (2022.01); *G06T 2207/20132* (2013.01)

(58) Field of Classification Search
CPC . G06T 5/77; G06T 2207/20132; G06V 10/25; G06V 10/44; G06V 10/60; G06V 10/751; G06V 20/17; G06V 20/188
See application file for complete search history.

(56) References Cited

U.S. PATENT DOCUMENTS

| | | | | |
|---|---|---|---|---|
| 6,121,977 | A * | 9/2000 | Arai | G06T 15/00 345/619 |
| 10,196,141 | B1 * | 2/2019 | Cui | H04N 7/181 |
| 10,281,916 | B1 * | 5/2019 | Cui | G05D 1/101 |
| 10,334,180 | B1 * | 6/2019 | Asano | H04N 23/71 |
| 10,410,334 | B2 * | 9/2019 | Cohen | G06Q 50/02 |

(Continued)

*Primary Examiner* — Aaron W Carter
(74) *Attorney, Agent, or Firm* — Kinney & Lange, P.A.

(57) ABSTRACT

Provided are a method for inpainting a highlight region of a vegetation image captured by an unmanned aerial vehicle, a device, a medium, and a product. The method includes: acquiring an image to be inpainted, and a historic image; inputting the image to be inpainted to a trained target detection network to obtain a waterbody highlight region image block; determining a template image block of the image to be inpainted based on the waterbody highlight region image block; cropping the historical image to obtain a plurality of candidate image blocks of the image to be inpainted; determining similarity between each candidate image block and the template image block by using a deep learning image coarse matching method; and screening candidate image blocks with the similarity greater than a predetermined threshold, and determining an optimal candidate image block in the candidate image blocks by using a pixel-by-pixel matching method.

14 Claims, 5 Drawing Sheets

(56) References Cited

U.S. PATENT DOCUMENTS

| | | | | |
|---|---|---|---|---|
| 11,854,258 | B1* | 12/2023 | Murphy | G01C 11/06 |
| 2004/0165788 | A1* | 8/2004 | Perez | G06T 11/60 |
| | | | | 382/284 |
| 2009/0033661 | A1* | 2/2009 | Miller | G06T 15/60 |
| | | | | 345/426 |
| 2011/0299777 | A1* | 12/2011 | Tilton | G06T 7/187 |
| | | | | 382/173 |
| 2012/0070071 | A1* | 3/2012 | Rankin | G06V 20/58 |
| | | | | 382/154 |
| 2012/0320219 | A1* | 12/2012 | David | G01S 17/89 |
| | | | | 348/169 |
| 2014/0119639 | A1* | 5/2014 | Shah | G06T 7/55 |
| | | | | 382/154 |
| 2014/0198211 | A1* | 7/2014 | Giuffrida | G06T 7/0002 |
| | | | | 348/144 |
| 2018/0356221 | A1* | 12/2018 | Kusumoto | G06T 7/60 |
| 2019/0035071 | A1* | 1/2019 | Klein | G06Q 10/20 |
| 2022/0156492 | A1* | 5/2022 | Basu | G06T 5/40 |
| 2022/0326149 | A1* | 10/2022 | Zywicki | G01J 3/2823 |
| 2022/0414886 | A1* | 12/2022 | Laszlo | G06N 3/08 |
| 2023/0078777 | A1* | 3/2023 | Raj | G06T 5/80 |
| | | | | 382/275 |
| 2023/0162496 | A1* | 5/2023 | Basu | G06V 10/764 |
| | | | | 382/173 |
| 2024/0013531 | A1* | 1/2024 | Hu | G06V 10/764 |
| 2024/0087311 | A1* | 3/2024 | Soldevilla-Martinez | |
| | | | | G06V 20/188 |

* cited by examiner

METHOD FOR INPAINTING HIGHLIGHT REGION OF VEGETATION IMAGE CAPTURED BY UNMANNED AERIAL VEHICLE, DEVICE, MEDIUM, AND PRODUCT

CROSS-REFERENCE TO RELATED APPLICATION(S)

This patent application claims the benefit and priority of Chinese Patent Application No. 202410247135.1 filed with the China National Intellectual Property Administration on Mar. 5, 2024, the disclosure of which is incorporated by reference herein in its entirety as part of the present application.

TECHNICAL FIELD

The present disclosure relates to the technical field of agricultural remote sensing, and in particular to a method for inpainting a highlight region of a vegetation image captured by an unmanned aerial vehicle, a device, a medium, and a product.

BACKGROUND

The unmanned aerial vehicle remote sensing technology is widely used in agriculture, which is used to monitor crop growth, vegetation coverage and land use through aerial serial images. The main process of aerial photography is that the camera obtains electromagnetic waves reflected from the vegetation and incident from the sun, and then processes the electromagnetic waves to generate color images that conform to the habits of human eyes.

Under the environment of aquatic vegetation (e.g., rice and other crops that need irrigation during the growing period and farmland after rain), when the angle of sun incidence on a ground object is the same as the angle reflected to the camera by the ground object, the camera will get abnormal energy values due to mirror reflection characteristics of water, which results in white spots, i.e., highlight regions. The highlight region is able to cover the original vegetation information, resulting in partial information loss of the image, which is not conducive to the subsequent application research. Therefore, it is of a great research value to research a method for inpainting a waterbody highlight region of an unmanned aerial vehicle image to restore the original information.

SUMMARY

An objective of the present disclosure is to provide a method for inpainting a highlight region of a vegetation image captured by an unmanned aerial vehicle, a device, a medium, and a product. A waterbody highlight region of an unmanned aerial vehicle image can be accurately inpainted.

To achieve the objective above, the present disclosure employs the following technical solution:

In a first aspect, a method for inpainting a highlight region of a vegetation image captured by an unmanned aerial vehicle includes the following steps:

acquiring an image to be inpainted, and a historic image, where the image to be inpainted is an image with a highlight region, the historic image is an image obtained by capturing a target region at a previous moment, and the target region is a region shown in the image to be inpainted;

inputting the image to be inpainted to a trained target detection network to obtain a waterbody highlight region image block in the image to be inpainted;

determining a template image block of the image to be inpainted based on the waterbody highlight region image block, wherein the template image block is an adjacent image block of the waterbody highlight region image block, and the template image block is used for image block inpainting matching;

cropping the historic image based on a coarse tuning-fine tuning method to obtain multiple candidate image blocks of the image to be inpainted;

determining similarity between each candidate image block and the template image block by using a deep learning image coarse matching method based on the template image block;

determining candidate image blocks with the similarity greater than a predetermined threshold as target candidate image blocks, and determining an optimal candidate image block in the target candidate image blocks by a pixel-by-pixel matching method; and inpainting the waterbody highlight region image block according to the optimal candidate image block.

In this embodiment, prior to the inputting the image to be inpainted to a trained target detection network to obtain a waterbody highlight region image block, the method further includes:

constructing a target detection network, where the target detection network is a detection network determined based on an improved YoloV5 target detection algorithm, the improved YoloV5 target detection algorithm is an algorithm obtained by replacing an efficient channel attention (ECA) module in Backbone with a C3 module on the basis of an original YoloV5 target detection algorithm.

In this embodiment, a training process of the target detection network is as follows:

acquiring a sample image to be inpainted, where the sample image to be inpainted is an image with a waterbody highlight region image block; and based on the sample image to be inpainted, training the improved YoloV5 target detection algorithm by using an Adam model optimizer, thus obtaining the trained target detection network.

In this embodiment, the determining a template image block of the image to be inpainted based on the waterbody highlight region image block includes:

acquiring coordinates of a center point of the waterbody highlight region image block and a length of the waterbody highlight region image block;

determining an abscissa of a center point of the template image block according to Equation $center_{x_2} = center_{x_1} + l + cache$; and determining an ordinate of the center point of the template image block according to Equation $center_{y_2} = center_{y_1}$;

where $center_{x_1}$ is the abscissa of the center point of the waterbody highlight region image block; $center_{y_1}$ is the ordinate of the center point of the waterbody highlight region image block; $center_{x_2}$ is the abscissa of the center point of the template image block; $center_{y_2}$ is the ordinate of the center point of the template image block; l is the length of the waterbody highlight region image block; and cache is a predetermined image matching buffer distance.

In this embodiment, the determining similarity between each candidate image block and the template image block by using a deep learning image coarse matching method based on the template image block comprises:

extracting feature vectors from the template image block and each candidate image block by using a ViT deep learning model; and determining the similarity between each candidate image block and the template image block by using a cosine similarity calculation method according to the feature vectors in the template image block and each candidate image block.

In the embodiment, the determining an optimal candidate image block in the target candidate image blocks by a pixel-by-pixel matching method comprises:

determining the optimal candidate image block in the target candidate image blocks according to Equation $$R(x, y) = \frac{\sum_{i=1}^{m}\sum_{j=1}^{n}(I(i+x, j+y) - T(i, j))^2}{\sqrt{\sum_{i=1}^{m}\sum_{j=1}^{n}I(i+x, j+y)^2 * \sum_{i=1}^{m}\sum_{j=1}^{n}T(i, j)^2}},$$

where in the Equation, (x,y) denotes coordinates of a search target in a source image; a pixel value on coordinates (i,j) of a template image is denoted by T(i,j), R(x,y) is a coefficient, as the R(x,y) decreases, the similarity between the target candidate image block and a template image block increases.

In this embodiment, after determining candidate image blocks with the similarity greater than a predetermined threshold as target candidate image blocks, and determining an optimal candidate image block in the target candidate image blocks by a pixel-by-pixel matching method, the method includes:

performing brightness equalization on the optimal candidate image block and the waterbody highlight region image block.

In a second aspect, a computer device is provided, including: a memory, a processor, and a computer program stored on the memory and capable of being operated on the processor. The processor, when executing the computer program, is configured to achieve steps of the method for inpainting a highlight region of a vegetation image captured by an unmanned aerial vehicle in the first aspect.

In a third aspect, a computer readable storage medium is provided. A computer program is stored on the computer readable storage medium, and the computer program, when executed by a processor, is used to achieve steps of the method for inpainting a highlight region of a vegetation image captured by an unmanned aerial vehicle in the first aspect.

In a fourth aspect, a computer program product is provided, including a computer program. The computer program/instruction, when executed by a processor, is used to achieve steps of the method for inpainting a highlight region of a vegetation image captured by an unmanned aerial vehicle in the first aspect.

According to specific embodiments of the present disclosure, the present disclosure has the following technical effects:

Disclosed are a method for inpainting a highlight region of a vegetation image captured by an unmanned aerial vehicle, a device, a medium, and a product. The method includes the following steps: acquiring an image to be inpainted, and a historic image, where the image to be inpainted is an image with a highlight region, the historic image is an image obtained by capturing a target region at a previous moment, and the target region is a region shown in the image to be inpainted; inputting the image to be inpainted to a trained target detection network to obtain a waterbody highlight region image block in the image to be inpainted; determining a template image block of the image to be inpainted based on the waterbody highlight region image block, where the template image block is an adjacent image block of the waterbody highlight region image block, and the template image block is used for image block inpainting matching; cropping the historic image based on a coarse tuning-fine tuning method to obtain multiple candidate image blocks of the image to be inpainted; based on the template image block, determining similarity between each candidate image block and the template image block using a deep learning image coarse matching method; determining candidate image blocks with the similarity greater than a predetermined threshold as target candidate image blocks, and determining an optimal candidate image block in the target candidate image blocks by a pixel-by-pixel matching method; and inpainting the waterbody highlight region image block according to the optimal candidate image block. According to the present disclosure, the highlight region is identified by the target detection network, which has a small technical difficulty and high precision, and meets the requirements of subsequent steps. Relying on the idea of coarse and fine granularity, the high-dimensional characteristics of the image and the size and distribution of traditional pixel values are both taken into consideration, and two image matching algorithms are adopted to accurately find the original texture of the highlight image block.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

Figure 1:
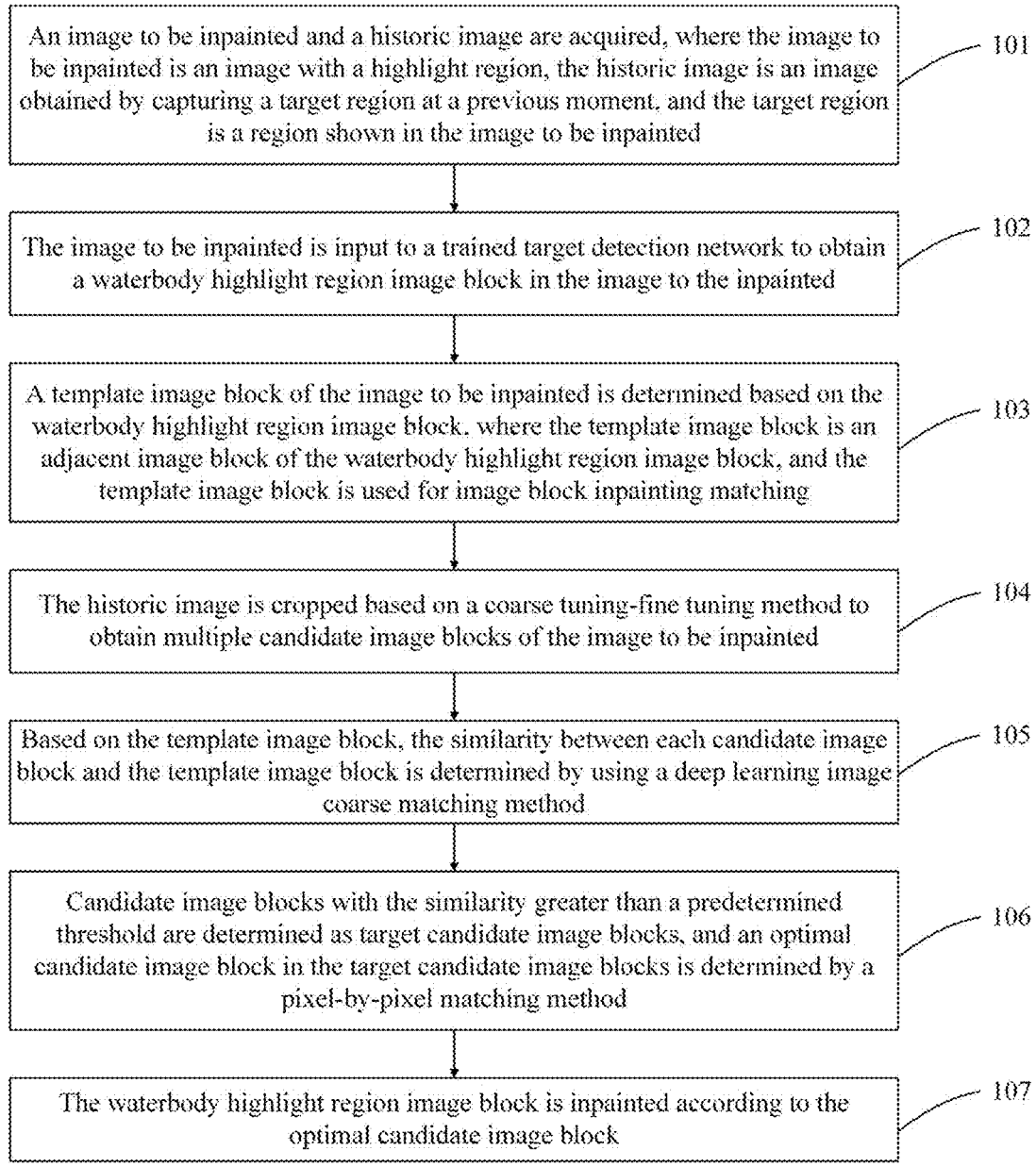
FIG. 1 is a flow chart of a method for inpainting a highlight region of a vegetation image captured by an unmanned aerial vehicle provided by Embodiment 1 of the present disclosure.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

At present, the research on waterbody highlight inpainting technology is still blank. However, many algorithms have been applied to solve the problem of image highlight caused by non-specific mirror reflection, including: an intrinsic image decomposition and dichromatic reflection model, a generative adversarial network model, a texture synthesis algorithm (such as Criminisi algorithm), a partial differential diffusion inpainting algorithm, a convolutional neural network model, and a generative diffusion model.

The texture synthesis algorithm and the partial differential diffusion inpainting algorithm, as classical image inpainting methods, are used to infer the unknown information of corrupted regions by analyzing the correlation and content similarity between pixels, and generated pixels are propagated by using a broadcast mechanism, so as to complete image inpainting. However, the two algorithms have limited effects when dealing with large or complex regions to be inpainted, the texture synthesis algorithm is mostly suitable for quick inpainting scenes such as scratches. While the partial differential diffusion inpainting algorithm generates texture relying on similar image blocks, in a case of complex texture structure, it is difficult to match the appropriate image block, leading poor inpainting effect.

The intrinsic image decomposition and dichromatic reflection model is used to decompose an image into a reflectance image and a shading image. Although the reflectance image can be processed, when the specular highlight has a high intensity and is wide in area, most of the texture information in these regions is lost, and the inpainted diffuse reflectance image is almost black image block, so the inpainting effect is unsatisfactory.

The generative adversarial network model and the convolutional neural network model have a poor performance in high-resolution image inpainting, and have high requirements for device, high calculation cost, time and space complexity, but insufficient effectiveness and interpretation. Therefore, these two models are more suitable for low-resolution image inpainting, such as face inpainting.

In comparison, in the generative diffusion model, a noisy picture is input into a UNET network, and the noise is removed in stages to generate an inpainted picture. The model, compared with the generative adversarial network, can control the generated content better, and support high-resolution image inpainting. However, the training process is slow, the requirement on GPU (graphics processing unit) resources is high, and the dimensionality reduction process still has some limitations.

In conclusion, the existing algorithm and model have common shortcomings in high-resolution image inpainting. That is, the inpainting effect can only be visually unified with a surrounding object. As each plant has a clear spatial position and texture characteristics in the image, and the number of plants is also determined, these data are the basis of follow-up research and application, and thus higher inpainting accuracy is needed. The best effect of unmanned aerial vehicle image inpainting in the future should be to completely restore the original information, rather than just visual inpainting.

An objective of the present disclosure is to provide a method for inpainting a highlight region of a vegetation image captured by an unmanned aerial vehicle, a device, a medium, and a product. A waterbody highlight region of an unmanned aerial vehicle image can be accurately inpainted.

In order to make the objectives, technical solutions and advantages of the present disclosure more clearly, the present disclosure is further described in detail below with reference to the embodiments.

Embodiment 1

As shown in FIG. 1, a method for inpainting a highlight region of a vegetation image captured by an unmanned aerial vehicle provided by this embodiment includes the following steps:

Step 101. An image to be inpainted and a historic image are acquired, where the image to be inpainted is an image with a highlight region, the historic image is an image obtained by capturing a target region at a previous moment, and the target region is a region shown in the image to be inpainted.

Step 102. The image to be inpainted is input to a trained target detection network to obtain a waterbody highlight region image block in the image to the inpainted.

Step 103. A template image block of the image to be inpainted is determined based on the waterbody highlight region image block, where the template image block is an adjacent image block of the waterbody highlight region image block, and the template image block is used for image block inpainting matching.

Step 104. The historic image is cropped based on a coarse tuning-fine tuning method to obtain multiple candidate image blocks of the image to be inpainted.

Step 105. Based on the template image block, the similarity between each candidate image block and the template image block is determined by using a deep learning image coarse matching method.

Step 106. Candidate image blocks with the similarity greater than a predetermined threshold are determined as target candidate image blocks, and an optimal candidate image block in the target candidate image blocks is determined by a pixel-by-pixel matching method.

Step 107. The waterbody highlight region image block is inpainted according to the optimal candidate image block.

In some implementations of the embodiment, prior to executing Step 102, the method includes the following steps:

A target detection network is constructed, where the target detection network is a detection network determined based on an improved YoloV5 target detection algorithm, and the improved YoloV5 target detection algorithm is an algorithm obtained by replacing an ECA module in backbone with a C3 module on the basis of an original YoloV5 target detection algorithm.

Figure 3:
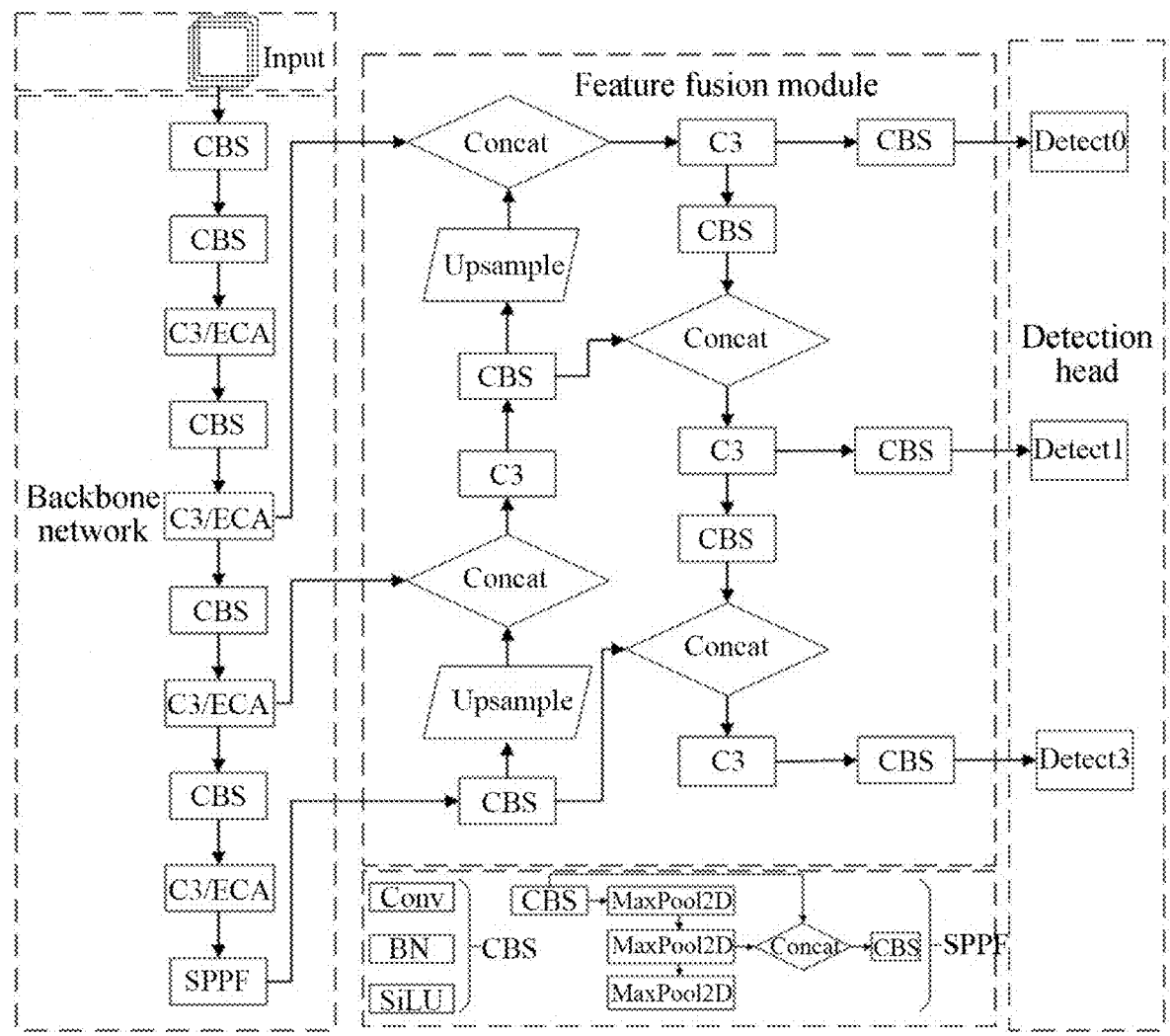
FIG. 3 is a structural schematic diagram of a designed YoloV5 model according to Embodiment 1 of the present disclosure.
Figure 4:
FIG. 4 is a picture as an image to be inpainted according to Embodiment 1 of the present disclosure.
Figure 5:
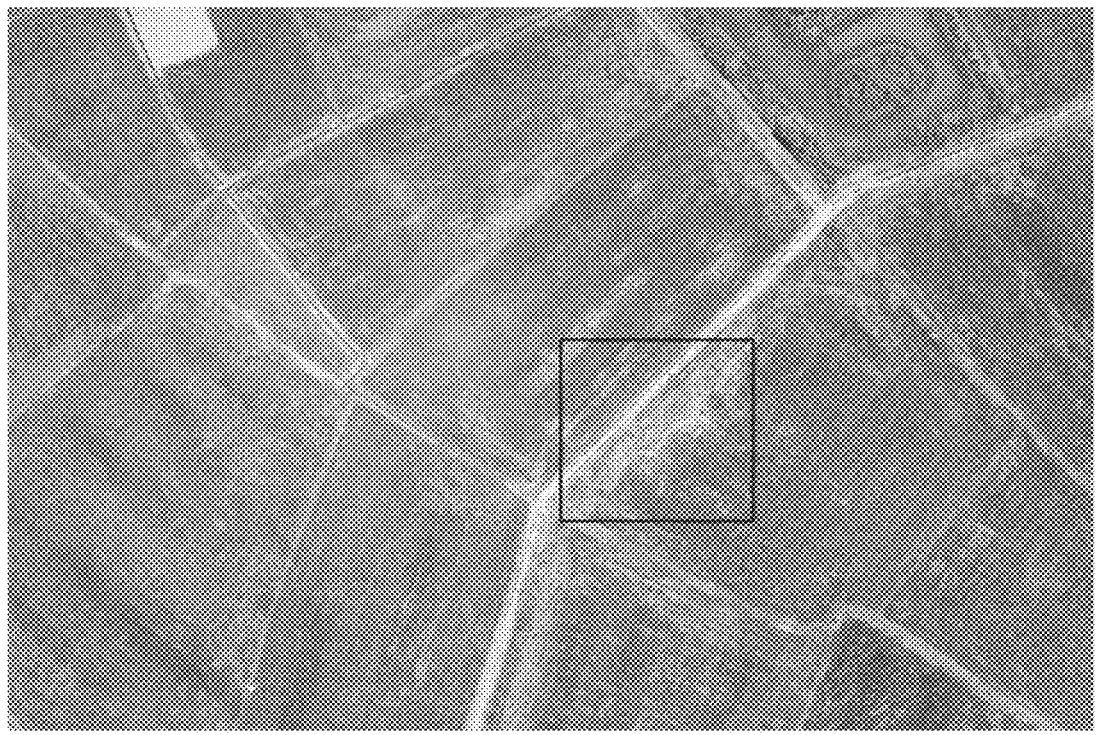
FIG. 5 is a picture as an inpainted image according to Embodiment 1 of the present disclosure.

Specifically, the improved YoloV5 model is as shown in FIG. 3.

In some implementations of the embodiment, a training process of the target detection network is specifically as follows:

Step 201. A sample image to be inpainted is acquired, where the sample image to be inpainted is an image with the waterbody highlight region image block.

Step 202. Based on the sample image to be inpainted, the improved YoloV5 target detection algorithm is trained by using an Adam model optimizer, thus obtaining a trained target detection network.

Specifically, a training strategy of the target detection network is as follows: the total step size of down-sampling is 32, the size of the input image is 3200*3200, and Adam serves as a model optimizer. An initial learning rate is 0.001, a weight attenuation is set to be 0.0005, the training rounds are 300, the batch-size is 4, and a loss function is the sum of classification loss, positioning loss and confidence loss. A weight model is obtained, and the trained target detection network is obtained according to the weight obtained by training.

In some implementations of the embodiment, a specific process of determining a template image block of the image to be inpainted in Step 103 may include the following steps:

Step 301. The coordinates of a center point of the waterbody highlight region image block and a length of the waterbody highlight region image block are acquired.

Step 302. The abscissa of a center point of the template image block is determined according to Equation $center_{x_2}=center_{x_1}+l+cache$.

Step 303. The ordinate of the center point of the template image block is determined according to Equation $center_{y_2}=center_{y_1}$.

$center_{x_1}$ is the abscissa of the center point of the waterbody highlight region image block; $center_{y_1}$ is the ordinate of the center point of the waterbody highlight region image block; $center_{x_2}$ is the abscissa of the center point of the template image block; $center_{y_2}$ is the ordinate of the center point of the template image block; l is the length of the waterbody highlight region image block; and cache is a predetermined image matching buffer distance.

In some implementations of the embodiment, a specific process of cropping the historic image based on a coarse tuning-fine tuning method to obtain multiple candidate image blocks of the image to be inpainted in Step 104 may include the following:

According to a position of the template image block, a conservative threshold related to shooting interval time of a camera and the speed of the unmanned aerial vehicle is set to a certain position of an image T-1 (historical image) on the basis of up-and-down translation along a strip direction. In a small interval, a fine-tuning threshold in up and down, left and right is set according to the conservative threshold mentioned above, and then a large number of candidate image blocks are obtained by cropping.

This process is set by route planning software when the unmanned aerial vehicle obtains an image, and is regarded as a known parameter. The speed of the UAV (Unmanned Aerial Vehicle) is usually between 5-14 m/s, the flight altitude depends on the image resolution, and the shooting time is jointly determined by the speed and camera shutter speed. Taking DJI Phantom 4Pro as an example, when the flight altitude is 50 m, the fore-and-aft overlap rate is 75%, the side overlap rate is 65%, the flight speed is 9.5 m/s, the shooting interval is 2 seconds, and the ground resolution is 1.4 cm/pix, all the above parameters can be set in DJI UAV route planning software (dji gs Pro). Only the flight altitude, fore-and-aft overlap rate and side overlap rate need to be set, and other parameters are automatically calculated by the software.

It should be noted that if the computer is sufficient in storage space, a fine-tuning threshold, instead of the conservative threshold, can be set directly in a route direction for cropping, without affecting the subsequent inpainting effect.

In some implementations of the embodiment, a specific process of determining a template image block of the image to be inpainted in Step 105 may include the following steps:

Step 401. Feature vectors in the template image block and each candidate image block are extracted using a ViT deep learning model.

Step 402. The similarity between each candidate image block and the template image block is determined using a cosine similarity calculation method according to the feature vectors in the template image block and each candidate image block.

Specifically, the deep learning image coarse matching is as follows: high-dimensional features in the template image block and the candidate image block $C_n$ are extracted by directly calling the ViT deep learning model, and all high-temperature features are flattened into feature vectors. Then, the feature vectors of $C_n$ and the template image block are subjected to cosine similarity calculation to obtain the similarity between each candidate image block $C_n$ and the template image block B, and the Equation is as follows:

$$\cos\theta = \frac{\vec{a}*\vec{b}}{|\vec{a}|*|\vec{b}|}$$

$$\cos\theta = \frac{\vec{a}*\vec{b}}{|\vec{a}|*|\vec{b}|}$$

$\vec{a}$ and $\vec{b}$ are respective feature vectors of two images. $|\vec{a}|$ is a modulus of a vector a, and $|\vec{b}|$ is a modulus of a vector b. The smaller the calculated θ is, the greater the cos θ is, the more similar the two images are.

In some implementations of the embodiment, a specific process of determining an optimal candidate image block in the candidate image blocks in Step 106 may include the following steps:

The candidate image blocks $C_n$ are arranged in a descending order according to the similarity, the last 80% candidate image blocks $C_n$ are eliminated.

Fine matching, namely template matching, is completed by a pixel-by-pixel matching method.

The template matching Equation is as follows:

$$R(x, y) = \frac{\sum_{i=1}^{m}\sum_{j=1}^{n}(I(i+x, j+y) - T(i, j))^2}{\sqrt{\sum_{i=1}^{m}\sum_{j=1}^{n}I(i+x, j+y)^2 * \sum_{i=1}^{m}\sum_{j=1}^{n}T(i, j)^2}}.$$

In the Equation, (x,y) denotes the coordinates of a search target in a source image, a pixel value on the (i,j) coordinates of the template image is denoted by T(i,j), R(x,y) is a coefficient; in response to decreasing the R(x,y), the similarity between the target candidate image block and the template image block increases.

Specifically, in this embodiment, the adjacent image block B is used as a template image block, the candidate image block serves as a source image block, and the template image block and the candidate image block are subjected to template matching based on normalized square difference. As the adjacent image block B has the same size as the source image block, only one coefficient R will be output for each matching. The candidate image block corresponding to a minimum value in R is selected, which is an optimal candidate image block most similar to the adjacent image block B.

The optimal candidate image block and the target image block finally used to replace the waterbody highlight region image block A satisfy a spatial position relationship between the adjacent image block B in the image T (image to be inpainted) and the waterbody highlight region image block A, and the optimal candidate image block is directly found in the image T-1 and named as image block D, which is the image block most similar to the waterbody highlight region image block A.

In addition, it is considered that an image T and the previous image T-1 will be slightly distorted due to different center shooting points of the camera. In this research, the homologous point pairs of the adjacent image block B and the optimal candidate image block are calculated by an SIFT (scale invariant feature transformation) algorithm, and a homography transformation matrix M (3*3) is calculated by a random sample consensus algorithm. The homography transformation matrix M can be used to represent the projection transformation rules of the image T and the image T-1. The algorithm is shown as follows:

$$\begin{bmatrix} x' \\ y' \\ 1 \end{bmatrix} = M \begin{bmatrix} x \\ y \\ 1 \end{bmatrix}.$$

The Equation is expanded and deformed, and the pixel coordinates are as follows:

$$dst(x', y') = \left( \frac{M_{11}x + M_{12}y + M_{13}}{M_{31}x + M_{32}y + M_{33}}, \frac{M_{21}x + M_{22}y + M_{23}}{M_{31}x + M_{32}y + M_{33}} \right);$$

In the Equation, x, y are the pixel coordinates of the image block D, x' and y' are corrected pixel coordinates.

In some implementations of the embodiment, after executing Step 106, the method includes the following steps:

The optimal candidate image block and the waterbody highlight region image block are subjected to brightness equalization.

Specifically, the optimal candidate image block or the waterbody highlight region image block is subjected to brightness enhancement. There may be slight brightness difference between an image block D and an image block A, so a RGB (red-green-blue) image can be transformed into a HSV (hue-saturation value) image, and a value of V can be increased in a HSV space. A reference coefficient is 1.1 times the original value V, and can fluctuate slightly.

Figure 2:
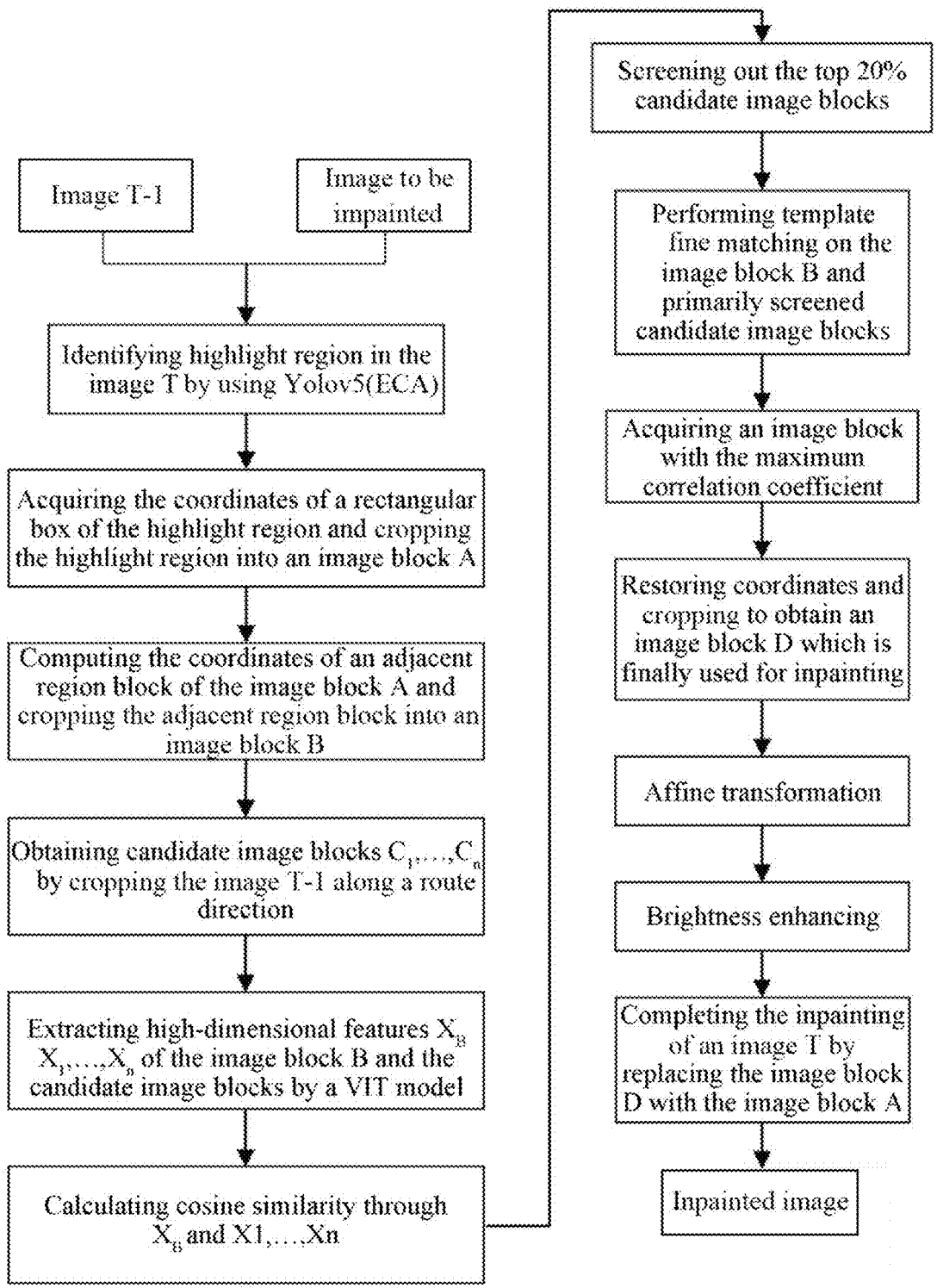
FIG. 2 is a flow chart of a highlight region inpainting method according to Embodiment 1 of the present disclosure.

In some implantations of the embodiment, an inpainting process of the method for inpainting a highlight region of a vegetation image captured by an unmanned aerial vehicle may be an inpainting process shown in FIG. 2.

Figure 6:
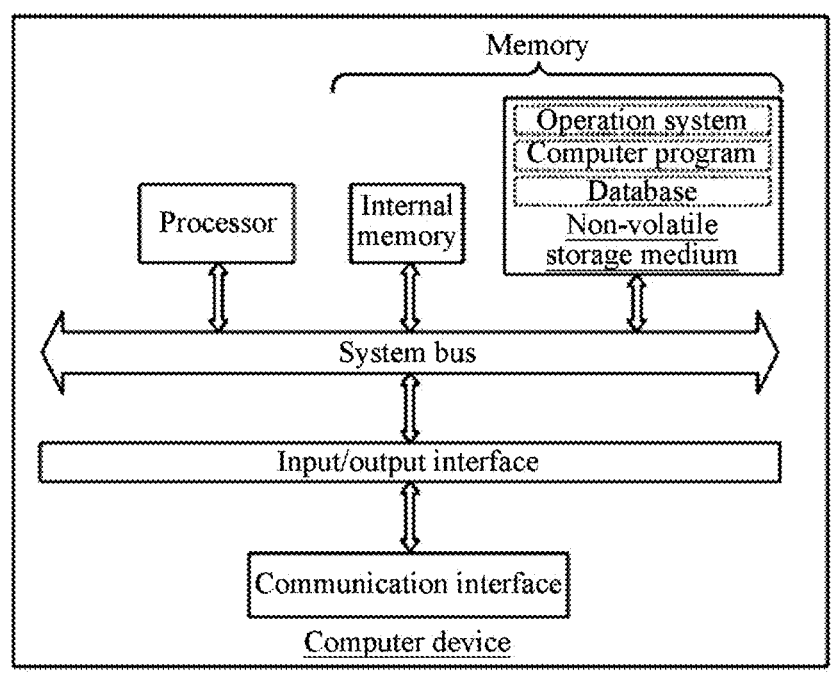
FIG. 6 is a diagram of an internal structure of a computer device according to an embodiment of the present disclosure.

In an embodiment, a computer device is provided, which may be a database, with an internal structural diagram shown in FIG. 6. The computer device includes a processor, a memory, an input/output interface (short for I/O), and a communication interface. The processor, the memory and the input/output interface are connected through a system bus, and the communication interface is connected to the system bus through the input/output interface. The processor of the computer device is used for providing computing and control capabilities. The memory of the computer device includes a non-volatile storage medium, and an internal memory. An operation system, a computer program and a database are stored in the non-volatile storage medium. The internal memory provides an environment for the running of the operation system and the computer program in the non-volatile storage medium. The database of the computer device is used for storing pending transactions. The input/output interface of the computer device is used for exchanging information between the processor and an external device. The communication interface of the computer device is used for communicating with an external terminal through a network. The computer program, when executed by the processor, achieves the method for inpainting a highlight region of a vegetation image captured by an unmanned aerial vehicle.

In one embodiment, a computer device is provided, including: a memory, a processor, and a computer program stored on the memory and capable of being operated on the processor. The processor, when executing the computer program, is configured to achieve steps in the method embodiments above.

In one embodiment, a computer readable storage medium is further provided, and a computer program is stored on the computer readable storage medium. The computer program, when executed by a processor, can achieve the steps in the method embodiments above.

In one embodiment, a computer program product is provided, including a computer program. The computer program, when executed by a processor, is used to achieve the steps in the method embodiments above.

It should be noted that the object information (including, but not limited to, object device information, object personal information, etc.) and data (including, but not limited to, data for analysis, stored data, displayed data, etc.) involved in the present disclosure are all information and data authorized by the object or fully authorized by all parties, and the collection, use and processing of relevant data need to comply with relevant laws, regulations and standards of relevant countries and regions.

Those skilled in the art can understand that all or part of flows in the method for achieving the above embodiments can be completed by instructing related hardware through a computer program, the computer program can be stored in a non-volatile computer readable storage medium, and when executed, the program may include the flows of the embodiments of the method. Any reference to the memory, database or other media used in the embodiments provided in the prevent disclosure may include at least one of a non-volatile memory, and a volatile memory. The non-volatile memory may include a read-only memory (ROM), a magnetic tape, a floppy disk, a flash memory, an optical memory, a high-density embedded non-volatile memory, a resistive random-access memory (ReRAM), a magneto-resistive random-access memory (MRAM), a ferroelectric random-access memory (FRAM), a phase change memory (PCM), a graphene memory, etc. The volatile memory may include a random access memory (RAM), or an external cache memory. By way of illustration than limitation, RAM may be in various forms, such as a static random access memory (SRAM) or a dynamic random access memory (DRAM). The database involved in each embodiment provided by the present disclosure may include at least one of a relational database, and a non-relational database. The non-relational database may include, but is not limited to, a distributed database based on a block chain. The processor involved in each embodiment provided by the present disclosure may be, but is not limited to, a general processor, a central processing unit, a graphics processor, a digital signal processor, a programmable logic, a data processing logic based on quantum computing, etc.

In conclusion, the present disclosure has the following beneficial effects:

Compared with the existing algorithm and model, the present disclosure has higher inpainting precision, which not only can complete super-resolution image inpainting, but also has low requirements on the computer device.

At first, the highlight region is identified by the target detection network, which is not only small in technical difficulty, but also high in precision, so it completely satisfies the demands of the following steps. Secondly, the idea of coarse and fine granularity is adopted, which not only considers the high-dimensional characteristics of images, but also considers the size and distribution of traditional pixel values. The original texture of the highlight image block can be found accurately by giving full play to respective advantages of the two different image matching algorithms. Therefore, the inpainting accuracy of the image block has reached a high level, and basically restores the position of the plant itself. After reducing the slight errors caused by different shooting points, the original ground object information in the highlight region can be restored. In comparison, the current other image inpainting method can only achieve visual unity with surrounding ground objects, but cannot achieve accurate restoring at pixel level.

In addition, the core of the present disclosure is to complete image inpainting through image matching. The core work of the image inpainting is completed by using a method of feature vector extraction and template matching. The used image matching method, either deep learning coarse matching or template matching, is small in computational burden, which makes the present disclosure have lower requirements on computer performance compared with the currently commonly used deep learning image inpainting methods (such as GAN (Generative Adversarial Network) and CNN (Convolutional Neural Network)).

At last, the classic image inpainting algorithm (e.g., partial differential diffusion inpainting, texture structure inpainting) has poor effect. At present, the mainstream inpainting model (deep learning model) is difficult to deal with the inpainting of ultra-high-resolution images (slow speed, unsatisfactory effect and extremely high requirements on computer graphics cards). The present disclosure can deal with the inpainting of the super-resolution image, and has obvious advantages.

The technical features of the above embodiments can be combined at will. In order to make the description concise, not all possible combinations of the technical features in the above embodiments are described. However, it should be considered that these combinations of technical features fall within the scope recorded in this specification provided that these combinations of technical features do not have any conflict.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A method for inpainting a highlight region of a vegetation image captured by an unmanned aerial vehicle, comprising:
acquiring an image to be inpainted and a historic image, wherein the image to be inpainted is an image with a highlight region, the historic image is an image obtained by capturing a target region at a previous moment, and the target region is a region shown in the image to be inpainted;
inputting the image to be inpainted to a trained target detection network to obtain a waterbody highlight region image block in the image to be inpainted;
determining a template image block of the image to be inpainted based on the waterbody highlight region image block, wherein the template image block is an adjacent image block of the waterbody highlight region image block, and the template image block is used for image block inpainting matching;
cropping the historic image based on a coarse tuning-fine tuning method to obtain a plurality of candidate image blocks of the image to be inpainted;
determining similarity between each candidate image block and the template image block by using a deep learning image coarse matching method based on the template image block;
determining candidate image blocks with the similarity greater than a predetermined threshold as target candidate image blocks, and determining an optimal candidate image block in the target candidate image blocks by a pixel-by-pixel matching method; and
inpainting the waterbody highlight region image block according to the optimal candidate image block.

2. The method according to claim 1, wherein prior to the inputting the image to be inpainted to a trained target detection network to obtain a waterbody highlight region image block, the method further comprises:
constructing a target detection network, wherein the target detection network is a detection network determined based on an improved YoloV5 target detection algorithm, wherein the improved YoloV5 target detection algorithm is an algorithm obtained by replacing an efficient channel attention (ECA) module in Backbone with a C3 module on the basis of an original YoloV5 target detection algorithm.

3. The method according to claim 2, wherein a training process of the target detection network is as follows:
acquiring a sample image to be inpainted, wherein the sample image to be inpainted is an image with a waterbody highlight region image block; and
based on the sample image to be inpainted, training the improved YoloV5 target detection algorithm by using an Adam model optimizer, thus obtaining the trained target detection network.

4. The method according to claim 1, wherein the determining a template image block of the image to be inpainted based on the waterbody highlight region image block comprises:
acquiring coordinates of a center point of the waterbody highlight region image block and a length of the waterbody highlight region image block;
determining an abscissa of a center point of the template image block according to Equation $center_{x_2} = center_{x_1} + l + cache$; and
determining an ordinate of the center point of the template image block according to Equation $center_{y_2} = center_{y_1}$;
wherein $center_{x_1}$ is an abscissa of the center point of the waterbody highlight region image block; $center_{y_1}$ is an ordinate of the center point of the waterbody highlight region image block; $center_{x_2}$ is the abscissa of the center point of the template image block; $center_{y_2}$ is the ordinate of the center point of the template image block; l is the length of the waterbody highlight region image block; and cache is a predetermined image matching buffer distance.

5. The method according to claim 1, wherein the determining similarity between each candidate image block and the template image block by using a deep learning image coarse matching method based on the template image block comprises:
- extracting feature vectors from the template image block and each candidate image block by using a ViT deep learning model; and
- determining the similarity between each candidate image block and the template image block by using a cosine similarity calculation method according to the feature vectors in the template image block and each candidate image block.

6. The method according to claim 1, wherein the determining an optimal candidate image block in the target candidate image blocks by a pixel-by-pixel matching method comprises:
determining the optimal candidate image block in the target candidate image blocks according to Equation $$R(x, y) = \frac{\sum_{i=1}^{m}\sum_{j=1}^{n}(I(i+x, j+y) - T(i, j))^2}{\sqrt{\sum_{i=1}^{m}\sum_{j=1}^{n}I(i+x, j+y)^2 * \sum_{i=1}^{m}\sum_{j=1}^{n}T(i, j)^2}};$$

wherein in the Equation, (x,y) denotes coordinates of a search target in a source image; a pixel value on coordinates (i,j) of a template image is denoted by T(i,j); and R(x,y) is a coefficient characterized in that as R(x,y) decreases, the similarity between the target candidate image block and a template image block increases.

7. The method according to claim 1, wherein after determining candidate image blocks with the similarity greater than a predetermined threshold as target candidate image blocks, and determining an optimal candidate image block in the target candidate image blocks by a pixel-by-pixel matching method, the method comprises:
performing brightness equalization on the optimal candidate image block and the waterbody highlight region image block.

8. A computer device, comprising: a memory, a processor, and a computer program stored on the memory and capable of being operated on the processor, wherein the processor, when executing the computer program, is configured to achieve steps of the method for inpainting a highlight region of a vegetation image captured by an unmanned aerial vehicle according to claim 1.

9. The computer device according to claim 8, wherein the processor, when executing the computer program, is configured to:
construct a target detection network, wherein the target detection network is a detection network determined based on an improved YoloV5 target detection algorithm, wherein the improved YoloV5 target detection algorithm is an algorithm obtained by replacing an efficient channel attention (ECA) module in Backbone with a C3 module on the basis of an original YoloV5 target detection algorithm.

10. The computer device according to claim 9, wherein the processor, when executing the computer program, is configured to:
acquire a sample image to be inpainted, wherein the sample image to be inpainted is an image with a waterbody highlight region image block; and
based on the sample image to be inpainted, train the improved YoloV5 target detection algorithm by using an Adam model optimizer, thus obtaining the trained target detection network.

11. The computer device according to claim 8, wherein the processor, when executing the computer program, is configured to:
acquire coordinates of a center point of the waterbody highlight region image block and a length of the waterbody highlight region image block;
determine an abscissa of a center point of the template image block according to Equation $center_{x_2} = center_{x_1} + l + cache$; and
determine an ordinate of the center point of the template image block according to Equation $center_{y_2} = center_{y_1}$;
wherein $center_{x_1}$ is an abscissa of the center point of the waterbody highlight region image block; $center_{y_1}$ is an ordinate of the center point of the waterbody highlight region image block; $center_{x_2}$ is the abscissa of the center point of the template image block; $center_{y_2}$ is the ordinate of the center point of the template image block; l is the length of the waterbody highlight region image block; and cache is a predetermined image matching buffer distance.

12. The computer device according to claim 8, wherein the processor, when executing the computer program, is configured to:
extract feature vectors from the template image block and each candidate image block by using a ViT deep learning model; and
determine the similarity between each candidate image block and the template image block by using a cosine similarity calculation method according to the feature vectors in the template image block and each candidate image block.

13. The computer device according to claim 8, wherein the processor, when executing the computer program, is configured to:
determine the optimal candidate image block in the target candidate image blocks according to Equation $$R(x, y) = \frac{\sum_{i=1}^{m}\sum_{j=1}^{n}(I(i+x, j+y) - T(i, j))^2}{\sqrt{\sum_{i=1}^{m}\sum_{j=1}^{n}I(i+x, j+y)^2 * \sum_{i=1}^{m}\sum_{j=1}^{n}T(i, j)^2}};$$

wherein in the Equation, (x,y) denotes coordinates of a search target in a source image; a pixel value on coordinates (i,j) of a template image is denoted by T(i,j); and R(x,y) is a coefficient characterized in that as R(x,y) decreases, the similarity between the target candidate image block and a template image block increases.

14. The computer device according to claim 8, wherein the processor, when executing the computer program, is configured to:
perform brightness equalization on the optimal candidate image block and the waterbody highlight region image block.

* * * * *